United States Patent [19]

Masters

[11] 3,967,997

[45] July 6, 1976

[54] METHODS OF AND APPARATUS FOR PRODUCING A STRESS-FREE LAMINATE

[75] Inventor: Charles Henry Masters, Baltimore, Md.

[73] Assignee: Western Electric Company, Inc., New York, N.Y.

[22] Filed: Jan. 31, 1973

[21] Appl. No.: 328,236

Related U.S. Application Data

[63] Continuation-in-part of Ser. No. 129,890, March 31, 1971, abandoned.

[52] U.S. Cl. ................................ 156/201; 156/222; 156/282; 156/309; 156/461; 561/498

[51] Int. Cl.[2] ..................... B32B 31/06; B32B 31/14

[58] Field of Search ................. 156/85, 102, 47, 50, 156/160, 163, 164, 201, 212, 282, 309, 494, 203, 218; 29/446, 487, 488, 497.5, 624; 161/216

[56] References Cited

UNITED STATES PATENTS

| | | | |
|---|---|---|---|
| 775,541 | 11/1904 | McConnell | 156/203 |
| 2,860,409 | 11/1958 | Boessenkool et al. | 29/497.5 |
| 2,944,586 | 7/1960 | Yanulis | 161/216 |
| 3,001,901 | 9/1961 | Barkley | 156/222 |
| 3,037,868 | 6/1962 | Rosser | 156/85 |
| 3,094,453 | 6/1963 | Scherer | 156/494 |
| 3,127,304 | 3/1964 | Borup | 156/163 |
| 3,228,103 | 1/1966 | Shewmon | 29/497.5 |
| 3,402,086 | 9/1968 | Smith et al. | 161/216 |
| 3,620,898 | 11/1971 | Harris et al. | 156/85 |
| 3,725,169 | 4/1973 | Allen et al. | 156/309 |
| 3,736,203 | 5/1973 | Miura | 156/164 |

*Primary Examiner*—Douglas J. Drummond
*Assistant Examiner*—Basil J. Lewris
*Attorney, Agent, or Firm*—E. W. Somers

[57] ABSTRACT

Tandem operations for manufacturing coaxial cable units include new and unobvious methods and apparatus for laminating an outer conductor, for drawing an inner conductor, for applying plastic discs to the inner conductor and for corrugating the outer conductor. Laminating the outer conductor is accomplished by passing a copper, copolymer adhesive, steel sandwich through three pairs of heated rolls. The heated laminate is passed over a roller designed to impart a three-dimensional curvature to the laminate. Then, the laminate is advanced in the manufacturing atmosphere and over another roller to remove the three dimensional curvature while the heat is removed. This produces a laminate which is essentially stress-free although composed of dissimilar materials. The inner conductor is drawn to a final diameter by an ultrasonically vibrating drawing die within a liquid medium which acts as a lubricant and as a cleaner to form a clean, smooth inner conductor. The drawn inner conductor is threaded through a disc applicator where polyethylene discs punched from strips of material are attached to the inner conductor by cooperatively arranged punching and injection facilities. The laminate passes to a pair of dancer-controlled pull rolls designed to feed the laminate to the corrugator with no back tension. The laminate is corrugated with a special profile to provide required material take-up, flexibility, and hoop strength and so that the overlap side nests with the opposite side. The corrugated laminate and the disc-insulated inner conductor are then fed into a tube forming machine where the corrugated laminate is wrapped around the disc-insulated inner conductor with an overlap seam that is soldered or otherwise joined.

10 Claims, 24 Drawing Figures

METHODS OF AND APPARATUS FOR PRODUCING A STRESS-FREE LAMINATE

CROSS REFERENCE TO RELATED APPLICATIONS

This application is a continuation-in-part application of Applicant's copending application Ser. No. 129,890, filed Mar. 31, 1971, now abandoned.

BACKGROUND OF THE INVENTION

1. Field of the Invention

A tandem line is provided to convert raw materials into a high frequency coaxial cable unit having a substantially stress-free corrugated laminated outer conductor in which the corrugations are symmetrical and uniform in size and do not contribute to undesirable variations in impedance of the coaxial cable unit. The coaxial cable unit possesses the desired physical and electrical characteristics with reduced potential for high voltage breakdowns between inner and outer conductors and relatively low structural return losses.

2. Description of the Prior Art

In high frequency transmission systems, such as those which employ coaxial cable units as the conductors, it is extremely important to maintain matched impedance between all components. The impedances of a coaxial unit must be precisely matched to the impedance of a repeater or other terminating devices connected to the coaxial unit. The impedance of a coaxial unit is related to the ratio between the diameters of the inner and outer conductors.

Inner conductors of coaxial units are, for the most part, drawn copper wire, the diameter of which can be controlled very closely. The outer conductors, on the other hand, are metallic tubes which, in most cases, are formed from flat metallic strips. In order to provide an efficient transmission system, it becomes extremely important to control precisely the diameter of the tubular outer conductor and to eliminate as much as possible any stress within the tubular structure which might cause distortion of the tubular conductor after it is formed.

In manufacturing coaxial cable units with corrugated outer conductors formed of steel, copper and polymer laminates, the laminate was formed by heating the three components while continuously maintaining them under pressure in a rolling operation. Since the two metallic components, steel and copper, had different coefficients of thermal expansion, the laminated material would tend to curl after being cooled to ambient temperature. Forming a tubular outer conductor of a laminate having such a curl would result in undesirable internal stresses being left in the outer conductor.

Another situation resulting in improper stress concentration within the outer conductor developed when the laminated material was corrugated in a roller-type corrugator. Corrugators used in the manufacturing systems are those which employ driven corrugating rollers to pull the laminated material into position between the rollers as the rollers are turned.

Corrugated material emerging from such a corrugator very often exhibits a distorted shape in the tooth profile. The tooth profile takes on a "saw tooth" appearance instead of a symmetrical shape and this asymmetry causes undesirable, nonuniform stresses within the outer conductor.

Still another cause of undesirable stressing within the outer conductor develops when the corrugated, laminated material is formed into exact sized tubular shape which is required in the outer conductor and the seam is secured by soldering or welding. In forming any metallic structure into a curved shape, such as a cross section of a tube, each stage of formation has associated with it a certain amount of inherent spring back of the metal. When a tube is secured at its seam, as is the case in the subject type of coaxial cable unit, and the inherent spring back is not allowed to relax, the spring back force is maintained as inner stress within the closed tubular outer conductor.

Another factor which will adversely affect the constancy of diameter of the outer conductor is a stretching out of corrugations after the corrugations have been impressed in the laminated outer conductor material. Such a stretching of corrugations will occur if there is a failure to coordinate the velocities of a capstan which is pulling a completed coaxial unit and a system which is driving rollers of a forming mill that is being used to form the outer conductor into its tubular shape.

If the forming mill lags the capstan in speed, the difference in linear velocities of the device will be taken up by a stretching of the coaxial units. If the coaxial unit is stretched, the overall height of the corrugations is reduced and, thus, there is a decrease in the diameter of the coaxial unit and a consequential change in the characteristic impedance of the unit.

In putting together a coaxial unit of the type described, it is extremely important to keep the inner components of the coaxial unit free of contaminants such as oil or dust because of the increased probability of high voltage breakdowns which would occur because of the presence of such contaminants. In order to reduce the level of contamination within the coaxial unit, it is current practice to clean the center conductor thoroughly before introducing it into the coaxial unit.

Previous practice in the field of manufacturing coaxial cable units was one in which wires for inner conductors were subject to meticulous cleaning so that all wire drawing lubricant residue was removed from the surface of the wire and this cleaning was done in an operation separate from actual fabrication of the coaxial cable unit. As a result of using separate operations, the wire for center conductors was wound on reels and was passed over various guide pulleys before being insulated with discs and finally assembled into a coaxial cable unit. As a result of meticulous cleaning, which left the wire surface free of any lubrication and subsequent abrasive action between the wire surface and adjacent sections of the wire on reels and the various guide pulleys over which the wire was passed, there developed some chafing of the wire which, at times, caused sharp splinters and/or flakes of copper to exist on the surface of the wire. The sharp splinters and/or flakes of copper were places where an increased probability for high voltage breakdown between the inner conductor and the outer conductor of the coaxial cable unit existed. Also, these splinters and/or flakes are a means for generating corona when a voltage less than breakdown is applied to the coaxial cable unit. The presence of corona at or near the polyethylene insulating discs will create oxalic acid which will eventually oxidize the polyethylene disc and create a high voltage breakdown.

Another problem which develops in the manufacture of coaxial cable units is that of consistently applying insulating discs to the center conductor at high speeds. The present state of the art with respect to application of discs to inner conductors is one in which discs are punched in an operation separate from an in-line fabrication of the coaxial unit. The punched discs are batch-loaded into a hopper and are conveyed by vibratory and gravitational feeding systems to an insertion device. The existence of static charge on the surface of the discs very often results in the discs not feeding properly. This causes spaces to develop along the inner conductor where no discs are placed. These spaces manifest themselves as undesirable impedance discontinuities.

The prior art discloses methods of making metalclad, plywood panels having a desired configuration at ambient temperature. A hot bonded panel will tend to warp or bow after cooling below the bonding temperature because of the different forces exerted on opposite sides of the core by metal members having different thicknesses and metallurgical properties. The metal members may be selected so that the relationship of the forces exerted by the metal members on the core are controlled in a predetermined manner. In the alternative, forces are applied to the fully or partially cooled panel to permanently deform one of the metal members and limit the stress developed by that member. This may be accomplished by applying the force to the panel supported along spaced edges or by passing the panel through a roller arrangement wherein one roller is arranged in seating relationship with a spaced pair of rollers.

SUMMARY OF THE INVENTION

With these and other objects in mind, the present invention contemplates tandem methods and apparatus for producing coaxial transmission media having an inner and outer conductor with insulating discs spaced along the inner conductor. The outer conductor is a laminate which is formed so as to be substantially free of stresses caused by variations in coefficients of thermal expansion of the various components of the laminate. This is accomplished first by imparting a predetermined three-dimensional curvature in each of the components of the laminate at approximately the elevated temperature at which an adhesive used to bond together the components is still flowable. Then the laminate is cooled to ambient temperature while the three dimensional curvature is removed therefrom.

Successive sections of a wire are reduced within a cleaning medium to the cross-sectional size of the inner conductor and then discharged from the medium along an axis about which the outer conductor is formed. Insulating discs are punched from sheet stock and applied directly to the inner conductor by injection devices associated with punching facilities with reduced potential for misfeeding of the insulating discs.

Corrugated outer conductors are formed from the laminate with controlled tension so that the corrugations are symmetrical and uniform in size so that their presence does not contribute to an undesirable variation of impedance in the coaxial cable units. Then the corrugated outer conductor is formed into a tube about the disc-insulated inner conductor.

The tandem production of coaxial cable units with the hereinbefore mentioned laminating, wire drawing, disc application and corrugating is accomplished to form units having reduced potential for high voltage breakdown between the inner and outer conductors thereof.

BRIEF DESCRIPTION OF THE DRAWINGS

Other objects and features of the present invention will be more readily understood from the following detailed description of specific embodiments thereof when read in conjunction with the accompanying drawings, in which.

DETAILED DESCRIPTION

Description of Coaxial Transmission Media

Figure 1:
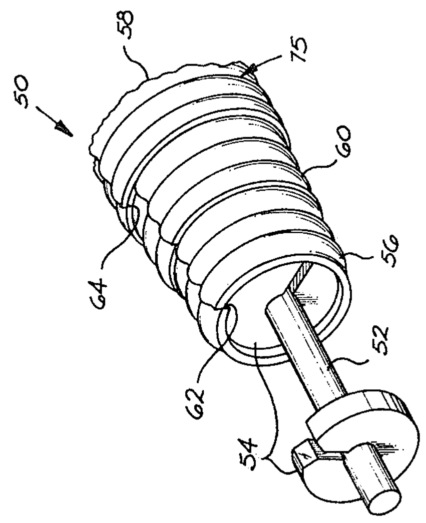
FIG. 1 is an enlarged perspective view of a coaxial cable unit having a corrugated laminate outer conductor embodying certain principles of the present invention.

Referring now to FIG. 1, a view of a coaxial cable unit, designated generally by the numeral 50, is shown. The unit 50 includes a center or inner conductor 52 and a plurality of insulating discs 54—54. The insulating discs 54—54 support the inner conductor 52 centrally within an outer tubular conductor 56. A shield 58 is formed about the outer conductor 56 and is laminated to the outer conductor with a film 60 of adhesive polymer. The outer conductor 56 and shield 58 are formed into a tube with the outer conductor having a partially butted seam 62 and the shield having a soldered overlapped seam 64.

Overall Description of Apparatus

Figure 2:
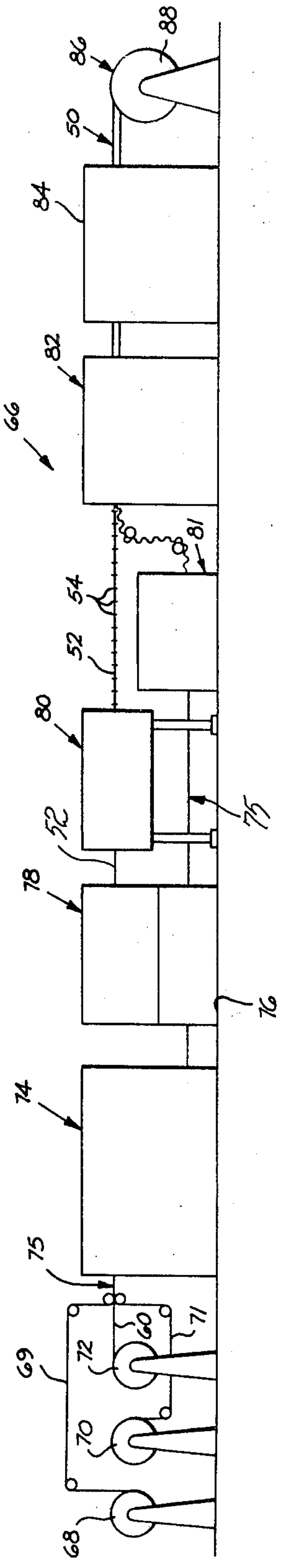
FIG. 2 is a schematic diagrammatic illustration of a side elevational view of a specific embodiment of an apparatus for forming the coaxial cable unit of FIG. 1 and embodying certain principles of the present invention.

FIG. 2 illustrates, schematically, a manufacturing line, designated generally by the numeral 66, for making the coaxial cable unit 50 continuously. The line 66 includes a supply position 68 for a copper tape 69 which will form the inner conductor 56, a supply position 70 for a steel tape 71 which will form the shield 58 and a supply position 72 for the film 60 of adhesive polymer which is used to join the copper tape 69 to the steel tape 71 to form a laminate designated generally by the numeral 75. The materials of each of the supply positions 68, 70 and 72 are guided into an alignment and laminating unit, designated generally by the numeral 74. The unit 74 is used to heat and laminate together the materials which are fed through the unit. A wire supply position 76 is used to supply a wire (not shown) to a wire drawing machine, designated generally by the numeral 78, which draws the wire supplied thereto into the size and shape necessary for the inner conductor 52. The inner conductor 52 passes from the wire drawing machine 70 to a disc applicator, designated generally by the numeral 80, which applies the insulating discs 54—54 to the inner conductor 52 with a desired spacing.

The composite outer conductor 58, film 60, and shield 59 are fed through a corrugator, designated generally by the numeral 81, and into a tube forming and soldering machine, designated generally by the numeral 82, along with the inner conductor 52 and the insulating discs 54—54. Within the tube forming and soldering machine, the various elements of the coaxial cable unit 50 are assembled and a main capstan 84 is used to draw the completed unit from the machine 82. A take-up, designated generally by the numeral 86, is used to wind the completed coaxial cable unit 50 onto a reel 88.

Laminating

Figure 3:
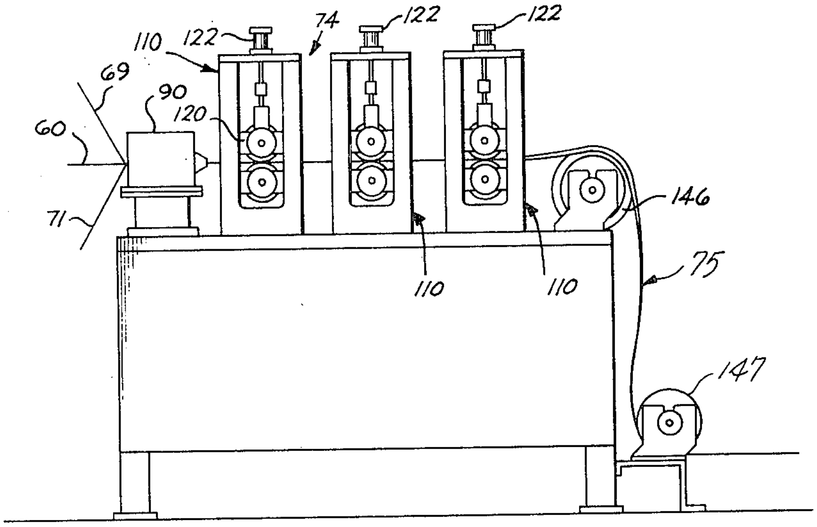
FIG. 3 is an enlarged side elevational view of an alignment and laminating unit of the apparatus of FIG. 1.

Referring now to FIG. 3, the copper strip 69 and the steel strip 71 are brought together at an alignment device 90 which is part of the alignment and lamination unit 74. The alignment device 90 provides alignment of materials as described in the prior art.

As portions of the aligned copper strip 69, steel strip 71 and film 60 of adhesive plastic emerge from the alignment device 90, they proceed to the first of three identical heating stands, designated generally by the numerals 110—110.

Figure 4:
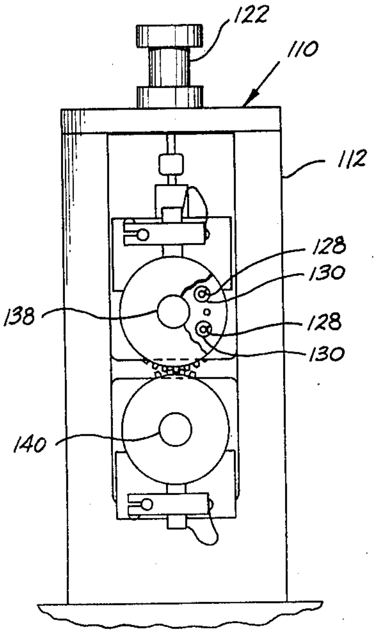
FIG. 4 is an enlarged side elevational view of a heating stand of the alignment and laminating unit of FIG. 3.
Figure 5:
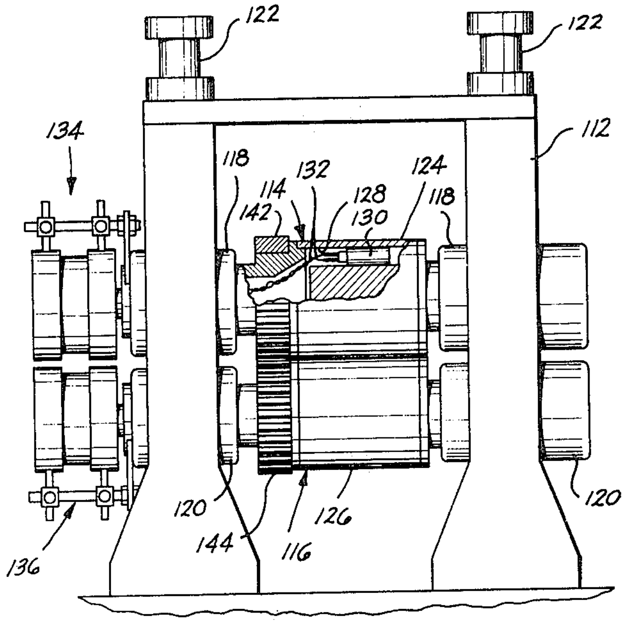
FIG. 5 is a front elevational view of the heating stand of FIG. 4.

Referring now to FIGS. 4 and 5, each of the heating stands 110—110 is provided with a main frame 112. An upper heating roll, designated generally by the numeral 114, and a lower heating roll designated generally by the numeral 116, are mounted rotatably in conventional bearings 118—118. The bearings 118—118 which support the upper heating roll 114 are supportd slidably in bearing mounts 120—120. The vertical position of the slidable bearing mounts 120—120 can be changed by operating air cylinders 122—122 which are mounted on the main frame 112. When the pistons of the air cylinders 122—122 are withdrawn, the heated rolls 114 and 116 are disengaged from each other; and the combination of the copper tape 69, steel tape 71 and film 60 of adhesive plastic can be threaded between the two rolls with ease. When the pistons of the air cylinders 122—122 are extended, the rolls 114 and 116 engage with the tapes 69 and 71 with a desired force. The force can be determined by regulating the air pressure within the air cylinders 122—122.

Each of the heated rolls 114—114 and 116—116 includes a body portion 124 and 126, respectively, constructed of stainless steel with at least a 32 micro finish on the outer peripheral surface which contacts one of the tapes 69 and 71. Each of the body portions 124 and 126 is provided with six cylindrical ports 128—128 (see FIG. 4) extending therethrough, which ports are of sufficient size to accommodate conventional cartridge heaters 130—130. It has been found that the cartridge heaters 130—130 are sufficient to provide the desired heating if they are of a rating of 230 watts. Leads 132—132 extend out from each of the cartridge heaters 130—130 to conventional slip ring assemblies, designated generally by the numerals 134 and 136, which are mounted on shafts 138 and 140 of the rolls 114 and 116, respectively.

Spur gears 142 and 144 are mounted concentrically on the rolls 142 and 144. The spur gears 142 and 144 synchronize the rotational velocity of the rolls 114 and 116 so that differential slippage by the rolls is prevented. A conventional drive motor (not shown) can be used to propel the lower heated roll 116 when it is necessary to do so in order to maintain proper tension control within the tapes 69 and 71 and the film 60. Synchronization between the drive motor (now shown) and the capstan 34 can be accomplished by conventional control means (not shown).

Referring again to FIG. 3, it can be seen that heating of the materials to be laminated is accomplished in three stages with each progressive stage being accomplished in a successive one of the heating stands 110—110. After portions of the materials to be laminated emerge from the last one of the heating stands 110—110, the materials are at a sufficiently high temperature, so that the film 60 of plastic adhesive is softened to a desired state and so that the surface condition of the copper and steel tapes 69 and 71, respectively, is such that proper adhesion will develop between the copper and steel tape and the film of plastic adhesive which is disposed therebetween.

Figure 6:
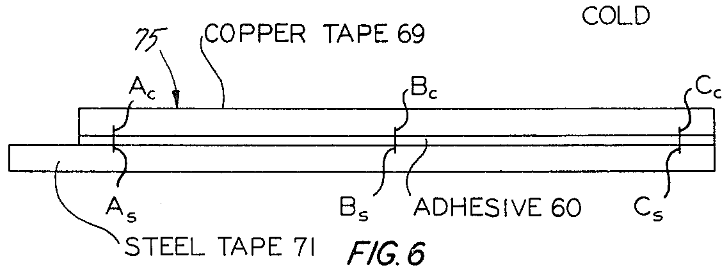
FIG. 6 is an enlarged cross sectional view of a laminate of the type formed by the apparatus of FIG. 1 at ambient temperature.
Figure 7:
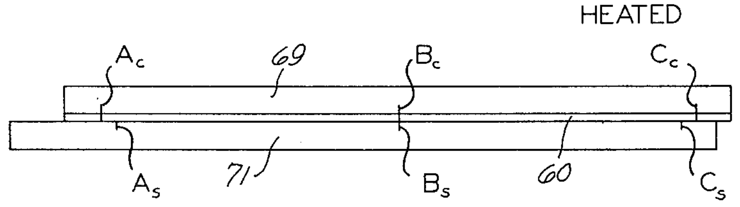
FIG. 7 is a cross sectional view of the laminate of FIG. 6 in a heated state.

Because copper and steel possess substantially different coefficients of thermal expansion, a situation illustrated in FIG. 6 develops. The steel tape 71 and the copper tape 69 placed together, when cold, might have a desired alignment which can be represented by imaginary registration marks, $A_c$, $A_s$, $B_c$, $B_s$, $C_c$ and $C_s$. If the example shown in FIG. 6 is heated, the difference that exists between the coefficients of expansion of copper and steel might cause a separation of the imaginary registration marks that is shown in FIG. 7. The registration marks $B_c$ and $B_s$ might still be aligned because they represent the middle portions of the copper and steel tapes 69 and 71, respectively; but registration mark $A_c$ is displaced from registration mark $A_s$ and registration mark $C_c$ is displaced from registration mark $C_s$.

It can probably be recognized that if the film 60 of adhesive plastic develops a bond between the tapes 69 and 71, while the registration marks $A_c$ and $C_c$ are displaced from the marks $A_s$ and $C_s$, respectively, then a final cooling to the state shown in FIG. 6 will result in a thermal shearing stress developing within the film 60. Since the film 60 is basically a polyethylene substance, the existence of a shearing-type stress will have a tendency to cause cold flowing of the adhesive material until the shearing stress is substantially eliminated. Diminishment of stress by means of cold flowing may take place over a long period of time, possible years, with the consequence that a change in stress level in the conductive portion of the coaxial cable unit 50 will also be occurring. Such a change in stress level of the conductive portion of the coaxial cable unit 50 may very well have an adverse effect on the constancy of the transmission characteristics of the coaxial cable unit. Such an inconstancy is undesirable in system where a great deal of care is expended in matching impedance of the transmission unit to the impedance of the various repeaters used in the system. A gradual change in stress level may contribute to highly mismatched impedances.

Figure 8:
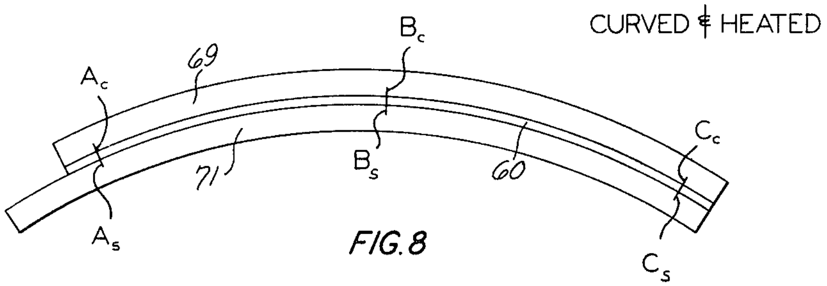
FIG. 8 is a cross sectional view of the laminate of FIGS. 6 and 7 in a curved and heated state.

It is possible to produce the coaxial cable units 50—50 wherein the film 60 is substantially stress free even at the time of manufacture. This can be accomplished by imparting a corrective spherical curvature to both the copper tape 69 and the steel tape 71 while bonding between the steel and copper tapes is occurring. As shown in FIG. 8, the mismatch between the registration marks $A_c$ and $A_s$ as well as the mismatch between $C_c$ and $C_s$ can be eliminated if the proper radius of curvature is imparted to the copper and steel tapes 69 and 71, respectively, Referring now to FIG. 3, it can be seen that such a spherical curvature can be imparted to the copper and steel tape 69 and 71 by passing portions of the laminate 75 over a roller 146 which is formed as a segmental portion of a sphere. The tapes 69 and 71 and the film 60 are passed around 90° of the curvature of the roller 146 from a horizontal to a vertical path. The radius of curvature of the spherical portion of the roller 146, the copper tape 69 and the steel tape 71 is determined from the following relationship:

1. $r_o = r_2 - r_2\,[(\Delta l_c t_c) - (\Delta l_s t_c)] - T_s/2$

2. $r_1 = r_o + T_s/2$

3. $r_2 = r_o + T_s + T_a + T_c/2$ where $r_o$ is the radius of the spherical roller 146;

$r_1$ is the radius of the center line of the steel tape 71 in the laminate 75;

$r_2$ is the radius of the center line of the copper tape 69 in the laminate 75;

$\Delta l_s$ is the length of expansion of the steel tape 71 in the laminate 75;

$\Delta l_c$ is the length of expansion of the copper tape 69 in the laminate 75;

$t_c$ is the temperature of the laminate 75 at the heating stands 110—110 minus ambient temperature;

$T_s$ is the thickness of the steel tape 71;

$T_c$ is the thickness of the copper tape 69;

$T_a$ is the thickness of the adhesive film 60.

After the tapes 69 and 71 have had a spherical curvature imparted to them by being passed over the spherical roller 146, they are allowed to proceed downwardly from the spherical roller while being colled to ambient temperature. It is preferable to allow the degree of curvature to develop into flatness in inverse proportional relationship with the rate at which cooling is occurring. The proportional relationship is not necessarily a unity proportion.

The laminate 75 is advanced from the roller 146 downwardly vertically and then into and out of engagement with a chill roller 147 (see FIG. 3). The chill roller 147 is cylindrical in shape having an axis of rotation parallel to the axis of rotation of the spherical roller 146.

After the laminate 75 is moved out of engagement with the chill roller 147, the laminate is advanced generally horizontally to the corrugating machine 81. The chill roller 147 is effective to remove the three-dimensional curvature which has been imparted to the laminate by the roller 146. By the time the laminate 75 is advanced out of engagement with the roller 147, the laminate is eseentially flat.

The laminate 75 is cooled while the three-dimensional curvature is removed therefrom. Of course, if the roller 147 were spaced far enough from the roller 146, the laminate 75 could be air cooled completely from its heated condition to ambient temperature. However, it has been found that if the laminate 75 is completely cooled down prior to being advanced around the roller 147, areas of delamination occur in the laminate as the laminate leaves the roller 147. Moreover, excessive distances between the rollers 146 and 147 would be required to cool the laminate 75 completely prior to the laminate engaging the roller 147.

In order to obviate the need of excessive manufacturing space and to avoid the formation of the undesired localized delamination, the roller 147 is chilled, for example, by water. The roller 147 is spaced closely enough to the roller 146 so that the cooling down completely of the laminate 75 is accomplished as the laminate goes around the roller 147.

WIRE DRAWING

Referring back to FIG. 2, it can be seen that wire for the inner conductor 52 is supplied from the wire supply 76 into the wire drawing machine 78 through conventional guiding pulleys (not shown).

Figure 9:
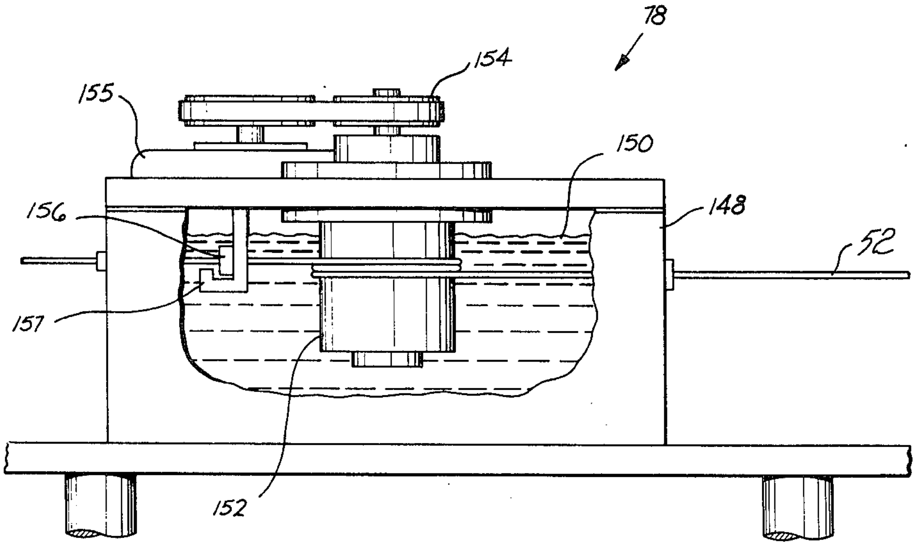
FIG. 9 is an enlarged side elevational view of a wire drawing machine of the apparatus of FIG. 1 with portions broken away for purposes of clarity.

Referring now to FIG. 9, a detailed view of the wire drawing machine 78 is shown. The wire drawing machine 78 includes a tank 148 which is partially filled with a fluid cleaning medium which also acts as a wire drawing lubricant. The fluid 150 can be a halogenated hydrocarbon, such as trichlorotrifluoroethane, e.g., Freon 114 as marketed by E. I. DuPont Company. It is known to use a liquid lubricating medium to facilitate wire drawing or to use devices for cleaning the wire in such an operation. The use of a liquid medium to facilitate a wire drawing operation as well as to clean the wire appears to be a departure from the prior art.

The inner conductor 52 is drawn through the wire drawing machine 78 by a tapered capstan 152 which is driven through a pulley 154 that is, in turn, driven by a motor 155. A conventional, ultrasonically vibrated, wire drawing die 156 is mounted within a holder 157 that is submerged within the fluid 150. The die 156 is used to reduce the size of the inner conductor 52 by approximately one AWG.

Proper tension is maintained in the inner conductor 52 on an output side of the capstan 152 by the main capstan 84 pulling the finished coaxial unit 50 and transmitting the force to the wire 52 through the insulating discs 54—54. Speed control is maintained by a conventional D.C. drive system with tachometer generator feedback control (not shown).

Use of the machine 78 in the location shown in FIG. 2 has a significant effect in reducing the problem of splintering caused by chafing which existed in the prior art. A reduction of splintering has a direct effect on reducing the probability of the occurrences of high voltage breakdowns between the inner conductor 52 and the outer conductor 56, generation of corona, and "structural-return-loss" reflections.

Since the inner conductor 52 is drawn in a cleaning medium such as halogenated hydrocarbon, the inner conductor emerges from the tank 148 in a very clean state. Moreover, after the inner conductor 52 emerges from the tank 148, the path of the inner conductor is straight, at least until the insulating discs 54—54 are placed on the inner conductor and the outer conductor 56 is applied around the discs 54—54. There are no intermediate bends placed in the inner conductor 52 nor is the inner conductor required to pass around any guide pulleys until after the outer conductor 56 is fully formed around the inner conductors. The only bending or scraping to which the inner conductor is exposed after passing through the die 156 is that which occurs when the inner conductor passes around the capstan 152. However, the capstan 152 is submerged within the fluid 150 and the fluid acts as a lubricant between the various convolutions of the inner conductor 52 and the capstan. Thus, it can be seen that the straight line approach to handling the inner conductor 52 is one which subsequently reduces the probability for experiencing high voltage breakdowns, etc. between the inner conductor 52 and the outer conductor 56.

Disc Applicator

Figure 10:
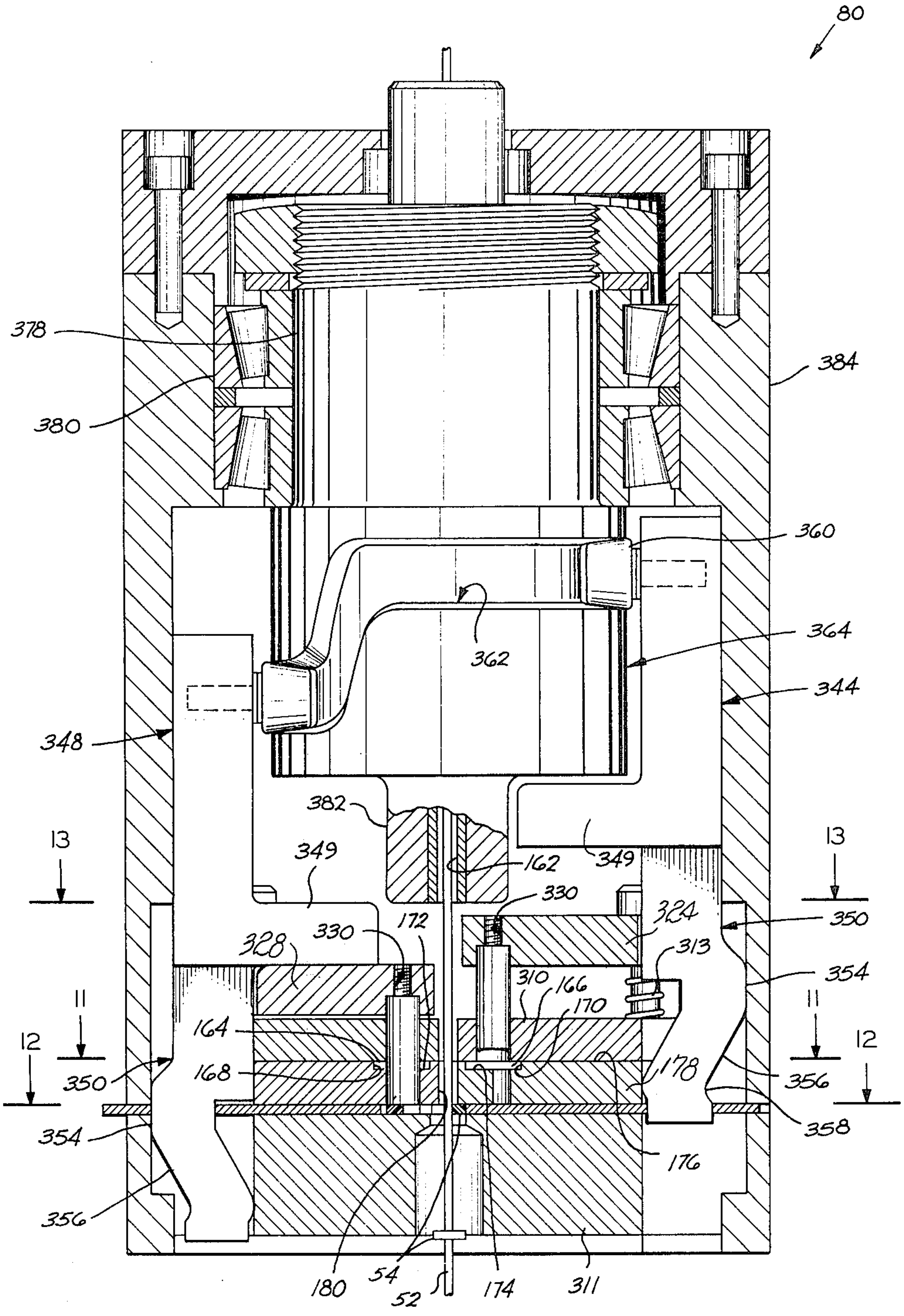
FIG. 10 is an enlarged sectional view of a disc applicator of the apparatus of FIG. 1.

Referring now to FIG. 10, the insulating discs 54—54 are applied to the inner conductor 52 of the coaxial cable unit 50 with the disc applicator 80. The disc applicator 80 is arranged so that the inner conductor 52 passes through a central aperture 162 formed through the length of the device.

Raw material for the insulating discs 54—54 is provided in the form of polyethylene tapes 164 and 166 which are continuous in length, have a width of 0.490 inches and a thickness of 0.083 inches. The polyethylene resin used to make the tapes 164 and 166 is high-density, electrical-insulating grade material.

The polyethylene tapes 164 and 166 are fed through two tape guiding passageways 168 and 170 which are oriented in a plane perpendicular to the inner conductor 52. The tape guiding passageway 168 is disposed on one side of the inner conductor 52, and the other tape guiding passageway 170 is on the other side of the conductor. The tape guiding passageways 168 and 170 are formed, in part, from tape guiding grooves 172 and 174, respectively, which are formed across an inner surface 176 of a die plate 178 (see FIGS. 10 and 11). At the center of the die plate 178 there is an aperture 180 through which the inner conductor 52 passes.

Arranged around the aperture 180 and cut into the die plate 178 are four disc dies, designated generally by the numerals 182, 184, 186, 188 which extend through the thickness of the die plate 178. The disc dies 182, 184, 186 and 188 are generally circular in shape. The centers of two of the disc dies 182 and 184 are aligned with the central axis of one of the tape guiding grooves 174; and similarly, the other disc dies 186 and 188 are located on the central axis of the other tape guiding groove 172.

Extending into the opening formed by each of the disc dies are slot curring projections, designated generally by the numerals 192, 194, 196 and 198. The projections 192, 194, 196 and 198 are each provided with narrow slot-forming portions 202, 204, 206 and 208, respectively, and tapered lead-in portions 212, 214, 216 and 218 (see FIG. 11). The lead-in portions 212, 214, 216 and 218 allow the insulating discs 54—54 which have been formed with the corresponding shape of the disc dies 182, 184, 186 and 188 to readily become engaged with the associated portions of the inner conductor 52 on which they are placed. The slot forming portions 202, 204, 206 and 208 are continuous with the tapered lead-in portions 212, 214, 216 and 218, respectively, and extend past the center lines of the disc dies 182, 184, 186 and 188, respectively, a sufficient distance so that the associated insulating discs 54—54 will have their central axes aligned with the portions of the inner conductor 52 on which they are placed.

Formed as depressions in the surface of the die plate 178 are four disc-applicator guide grooves, designated generally by the numerals 222, 224, 226 and 228. The grooves 222, 224, 226 and 228 have a depth corresponding substantially to the thickness of the insulating discs 54—54. Each of the grooves 222, 224, 226 and 228 is provided with a wide portion 232, 234, 236 and 238, respectively, and a narrow portion 242, 244, 246 and 248, respectively. The narrow portions 242, 244, 246 and 248 are just wide enough to provide proper sliding clearance for the discs 54—54 therein. The wide portions 232, 234, 236 and 238 are of sufficient width to provide a stable operating base for associated disc applicators, designated generally by the numerals 252, 254, 256 and 258, shown in FIG. 12.

The disc applicators 252, 254, 256 and 258 are flat plates made of tool steel. The applicators 252, 254, 256 and 258 are provided with wide portions, designated generally by the numerals 262, 264, 266 and 268, respectively (see FIG. 12), and narrow portions, designated generally by the numerals 272, 274, 276 and 278, respectively. The two portions correspond in size to the associated wide portions 232, 234, 236 and 238 and narrow portions 242, 244, 246 and 248 of the grooves 222, 224, 226 and 228, respectively. The narrow portions 272, 274, 276 and 278 of the disc applicators 222, 224, 226 and 228 are provided with ends 282, 284, 286 and 288 which are concave. The shapes of the ends 282, 284, 286 and 288 correspond substantially to the shape of the segment of the discs 54—54 which are engaged by the applicators 252, 254, 256 and 258.

The wide portions 262, 264, 266 and 268 have cam-operator openings 292, 294, 296 and 298, respectively (see FIG. 12), extending therethrough. The thickness of each of the disc applicators 252, 254, 256 and 258 is substantially the same as the thickness of the insulating discs 54—54. The die plate 178 is provided with four cam-operator notches 302, 304, 306 and 308 formed therein with each of the notches being in alignment with the central axis of one of the disc applicator guide grooves 222, 224, 226 and 228, respectively. The cam-operating notches 302, 304, 306 and 308 extend through the entire thickness of the die plate 178.

The center line of each of the disc dies 182, 184, 186 and 188 is sufficiently close to the center line of the inner conductors 52 so that when, for example, one of the discs 54—54 is pushed out of its associated disc applicator groove 222, the disc becomes engaged with the associated portion of the inner conductor 52 before it loses contact with the narrow portion 242 of the groove. This arrangement assures that control is maintained on the location of the disc 54 during the transfer thereof from the die plate 178 to the inner conductor 52.

The polyethylene tapes 164 and 166 are pulled through the respective tape guiding passageways 168 and 170 with a conventional roll feed device (not shown). The roll feed device is operated in a manner which will produce a two-space indexing of alternate tapes. In other words, as any polyethylene tape, e.g. 166, is indexed, it is moved a distance equal to the distance between the center lines of the disc dies 182 and 184. After indexing, both the disc die 182 and the disc die 184 will each cut one of the discs before another indexing will occur.

Figure 13:
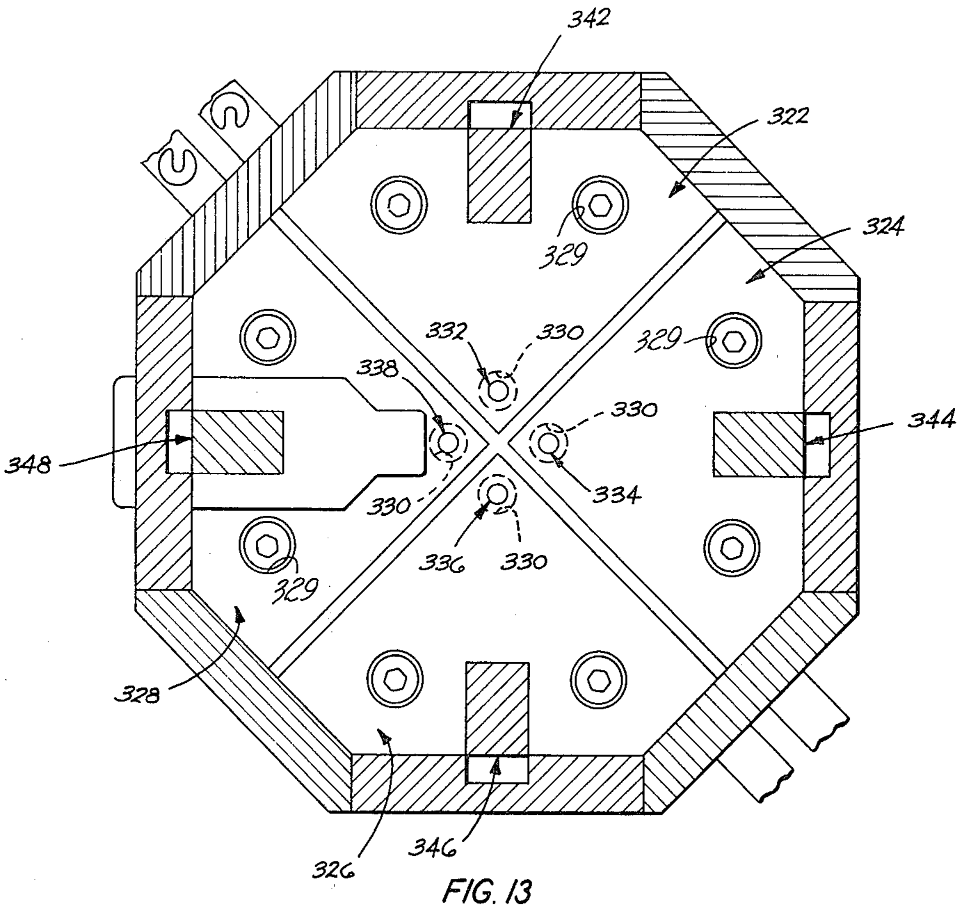
FIG. 13 is a sectional view of the disc applicator of FIG. 10 taken along lines 13—13 thereof.

Referring again to FIG. 10, there is shown a stripper plate 310 mounted inwardly of the die plate 178. An end plate 311 is mounted inwardly of the die plate 178. An end plate 311 is mounted outwardly of the die plate 178. The stripper plate 310 and the end plate 311 are each generally of the same outline configuration as the die plate 178. Compression springs 313—313 (see FIG. 10) are used to provide spring-biasing for four punch holders, designated generally by the numerals 322, 324, 326 and 328 which can be seen by referring now to FIG. 13. Each of the punch holders 322, 324, 326 and 328 corresponds in the shape of its outline to the shape of one quandrant of the die plate 178 (FIG. 10). Two shoulder bolt apertures 329—329 are provided in each of the punch holders 322, 324, 326 and 328. A punch holding aperture 330 is provided on each of the punch holders 322, 324, 326 and 328. The aperture 330 is of a shouldered and threaded configuraton.

Punches, designated generally by the numerals 332, 334, 336 and 338 are supported in each of the punch holders 322, 324, 326 and 328, respectively. Each of the punches is shaped to correspond substantially to the shape of each of the disc dies 182, 184, 186 and 188 with sufficient clearance to provide proper cutting of the polyethylene tapes 164 and 166. Each punch holder 322, 324, 326 and 328 is actuated with a cam link, designated generally by the numerals 342, 344, 346 and 348, respectively. Referring again to FIG. 10, a typical one of the cam links 342, 344, 346 and 348 (FIG. 13) includes a projection 349 for actuating the associated punch holders 322, 324, 326, and 328 and a cam portion, designated generally by the numeral 350.

The cam portion 350 is designed to drive the associated one of the disc applicators 252—252 perpendicularly of the motion of the cam links 342, 344, 346 and 348. The cam portion 350 is provided with a dwell section 354 with which the associated disc applicator 252 is held in a retracted position, a sloped traversing section 356 which operates on the associated disc applicator to move the disc applicator within the disc applicator grooves 222, 224, 226 and 228 and a sharply curved injection section 358 which operates to move the disc applicator into its final application position.

At the inner end of the cam link 342, there is a conventional cam follower 360. The cam follower 360 operates within a cam groove, designated generally by the numeral 362, formed as a depression into the surface of a barrel cam, designated generally by the numeral 364.

Figure 14:
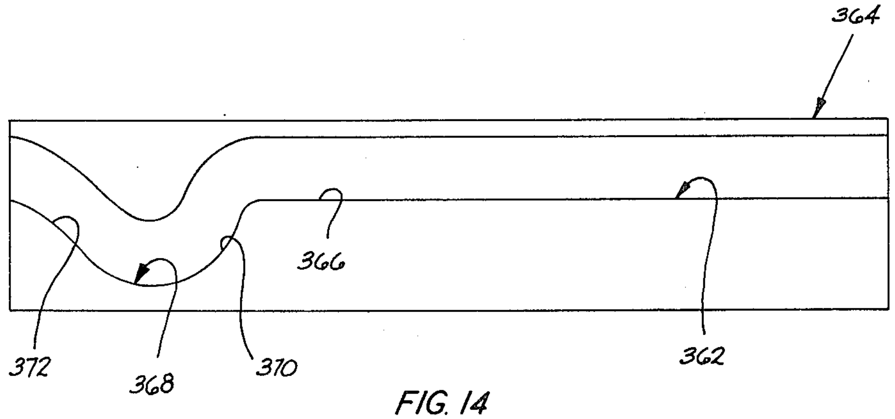
FIG. 14 is a cam chart of a barrel cam of the disc applicator of FIG. 10.

Referring now to FIG. 14, the cam groove 362 includes a passive portion 366 which encompasses approximately 260° of the surface of the barrel cam 364. The other 100° of the cam groove 362 is the active portion, designated generally by the numeral 368. The active portion 368 includes a punch engagement section 370 and a punch retraction section 372. The punch engagement section 370 is developed over 40° of the surface of the barrel cam 364, and the punch retraction section 372 is developed over 60° of the surface.

Referring again to FIG. 10, with the cam link 344 being typical, it can be seen that as the barrel cam 364 rotates about its axis, the cam followers 360 which are engaged with the passive portion 366 of the barrel cam hold the cam links 342, 344, 346 and 348 in a retracted position with respect to the associated one of the punch holders 322, 324, 326 and 328, respectively. Consequently, the associated one of the punches 332, 334, 336 and 338 is held in a retracted position because of the spring-biasing of the punch holders.

When, for example, the cam follower 350 associated with the cam link 344 becomes engaged with the active portion 368 (FIG. 14) of the cam groove 362, the cam link is driven so that the projection 349 becomes engaged with the punch holder 324. As the punch holder 324 is moved into engagement with the associated portion of the polyethylene tape 166, the sloped traversing section 356 of the cam portion 350 pulls the disc applicator 274 outwardly of its disc applicator guide groove 224 so that clearance is provided for the punch 334 to progress through its associated disc die 184. The actual punching of one of the insulating discs 54—54 (FIG. 1) takes place while the disc applicator 274 is engaged with the dwell section 354 of the cam link 344. The maximum stroke of the punch 334 occurs, of course, when the cam follower 360 is engaged with the innermost portion of the cam groove 362.

As the barrel cam 364 progresses in its rotation, the cam follower 360 becomes engaged with the punch retraction section 372 (FIG. 14) of the cam groove 362, thereby allowing the punch 334 to withdraw from its cutting position by the force of the compression spring 313 acting on the punch holder 324.

When the cam follower 360 enters the punch retraction section 372 (FIG. 14) of the cam groove 362, the cam link 344 sequentially moves so that the dwell section 354 becomes disengaged from the disc applicator 274 and the sloped traversing section 356 becomes engaged with the disc applicator, driving the disc applicator inwardly so that the disc applicator becomes engaged with one of the insulating discs 54—54. As the cam follower 360 approaches the passive portion 366 (FIG. 14) of the cam groove 362 but while it is still engaged with the punch retraction section 372 (FIG.

Figure 12:
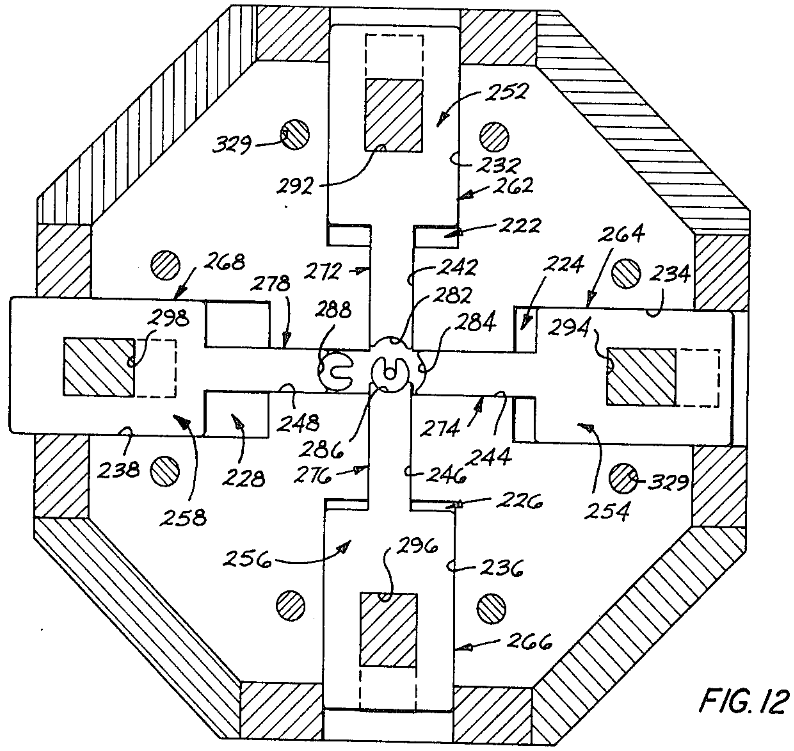
FIG. 12 is a sectional view of the disc applicator of FIG. 10 taken along lines 12—12 thereof.

14), the injection section 358 of the cam link 344 becomes engaged with the disc applicator 274 and provides the disc applicator with the motion necessary to press the insulating disc 54 onto the inner conductor 52 (see applicator 266 in FIG. 12). After the cam follower 360 reaches the passive portion 366 (FIG. 14) of the cam groove 362, the disc applicator 274 becomes engaged with an idling portion 366 of the cam link 344. In this position, the disc applicator 274 is held away from the path of the insulating discs 54—54 as they move along with the inner conductor 52 (see applicator 252 in FIG. 12).

As the barrel cam 364 continues to rotate, the active portion 368 (FIG. 14) of the cam groove 362, becomes sequentially engaged with the cam follower 360 of the cam links 342, 346 and 348 (FIG. 12). Continuous rotation of the barrel cam 364 provides a cyclic operation in which four of the insulating discs 54—54 are punched and applied to the inner conductor 52 for each revolution of the barrel cam.

The barrel cam 364 includes a support section 378 which is engaged with a conventional bearing 380. Also included on the barrel cam 364 is a cylindrical conductor guide portion 382 which is small enough in outside diameter to allow clearance for the projections 349—349 of the cam links 342, 344, 346 and 348.

The entire disc punching and application device 80 is housed in a main frame 384. The barrel cam 364 is geared by appropriate conventional driving means (not shown) to operate at the proper rotational speed to space the insulating discs 54—54 at the appropriate distances along the center conductor 52.

Figure 11:
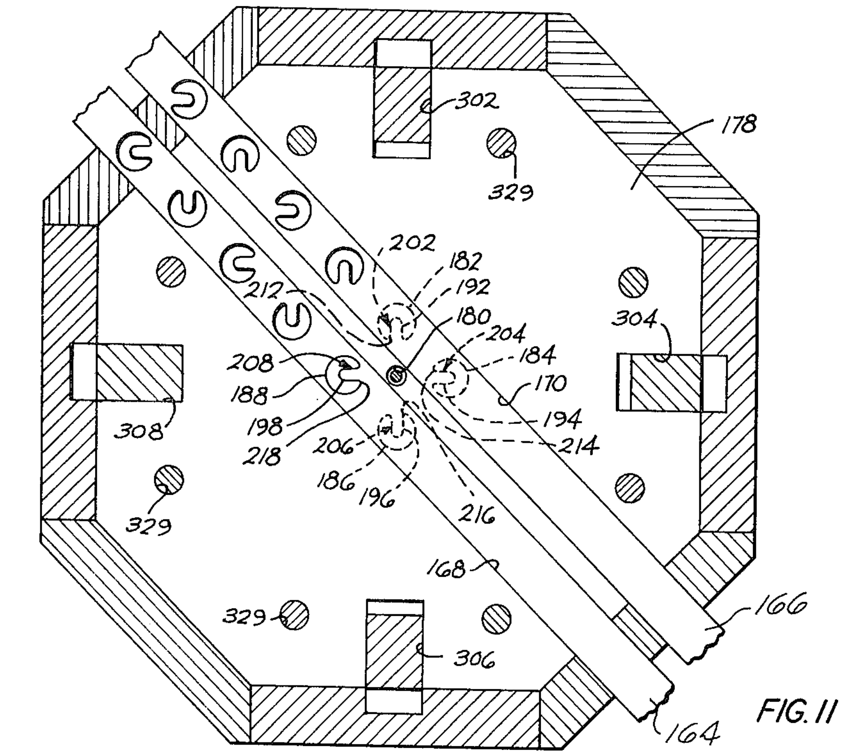
FIG. 11 is a sectional view of the disc applicator of FIG. 10 taken along lines 11—11 thereof.

As shown in FIG. 11, indexing of the polyethylene tape 164 is performed after the disc dies 186 and 188 have cut their respective insulating discs 54—54 from the tape 164 and during the time when the disc dies 182 and 184 are cutting their respective insulating discs from the polyethylene tape 166. Similarly, the polyethylene tape 166 is indexed when the cutting operation is being performed on the polyethylene tape 164.

CORRUGATING OF LAMINATE

Figure 15:
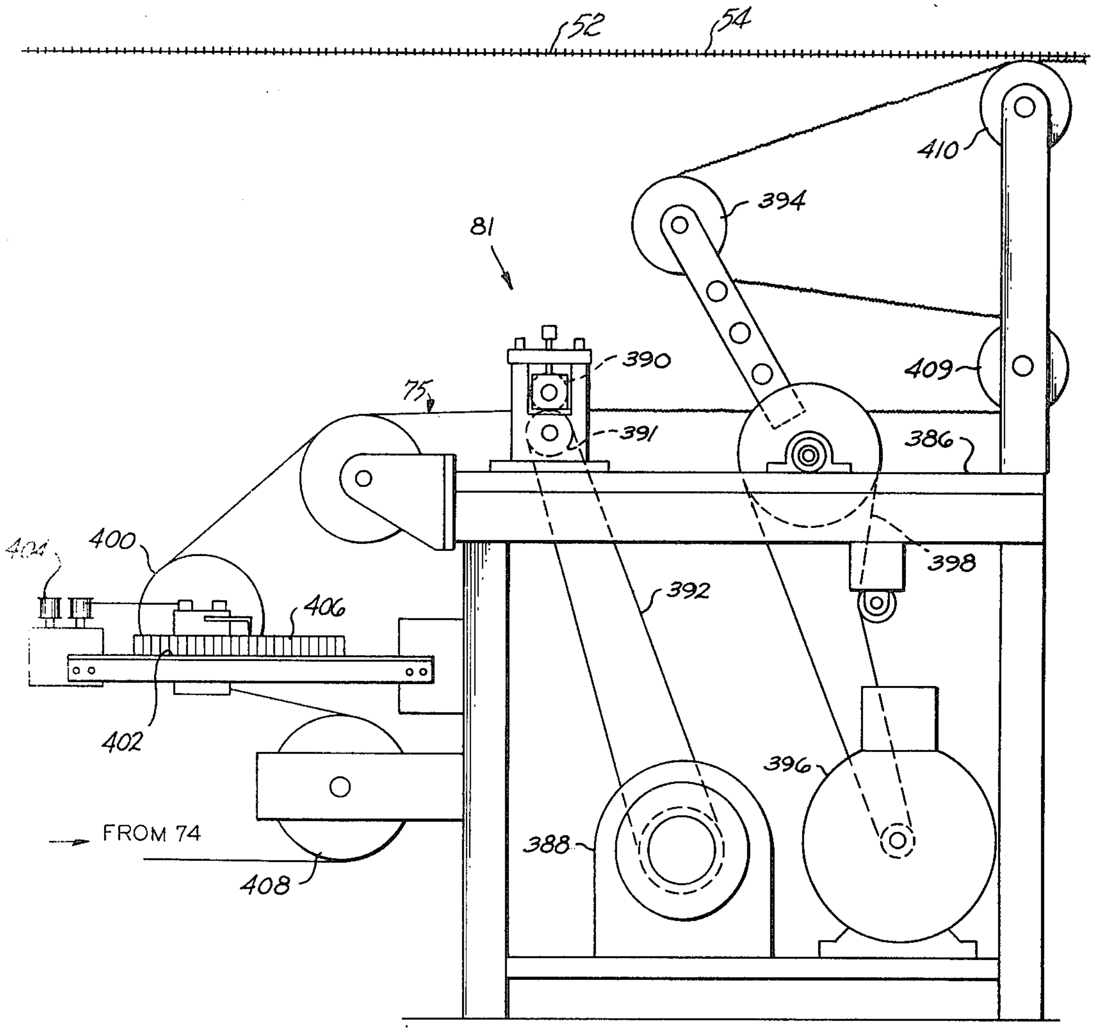
FIG. 15 is an enlarged side elevation of a corrugator of the apparatus of FIG. 1.

After the laminate 75 passes over the wire drawing machine 78 and the disc applicator 80, it reaches the corrugating maching 81, which can be seen by referring to FIG. 15. The corrugating machine 81 includes a frame 386 on which there is mounted a drive motor 388 which drives a set of corrugating rolls 390 and 391 through a belt 392. An output tension control roller 394 is coupled with a potentiometer 396 through a belt and pulley arrangement. Any variations in output speed of the corrugating rolls 390 and 391 can be detected and the potentiometer 396 can signal the motor 388 to compensate for the variation in speed through a control circuit (not shown).

Also included within the corrugating machine 81 is an input tension control roller 400. The roller 400 is mounted so that it can slide along a track 402 under the frame of a conventional spring motor 404 so that it can exert substantially constant tension on the laminate 75. Movement of the roller 400 along the track 402 causes a variation in a slide wire resistor arrangement 406. Variations in the resistance of the arrangement 406 causes variations in speed of the motor which drives the last one of the heating stands 110—110. Thus, the input tension of the laminate 75 is controlled as the laminate passes between the corrugating rollers 390 and 391.

Guide pulleys 408, 409 and 410 are used to provide appropriate paths for the laminate so that the tension control rollers 394 and 400 can function properly.

Figure 16:
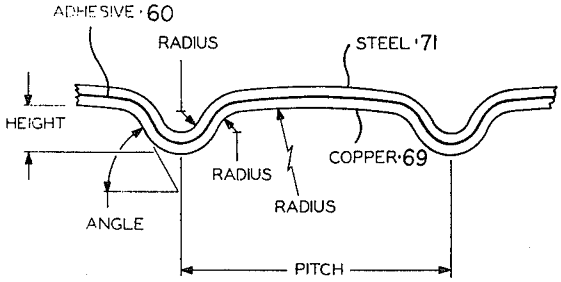
FIG. 16 is an enlarged cross sectional view of symmetrical laminated corrugated outer conductor embodying certain principles of the present invention.

By referring to FIG. 16, one can understand the utility in controlling the input tension of the laminate as it is being corrugated by the rollers 390 and 391.

For any particular rotational velocity of the rolls 390 and 391, the linear speed of the laminate will change as it progressed through the rolls. Since the peripheral speed of the rolls 390 and 391 is constant and the linear velocity of the laminate surface is changing, sliding of the laminate over the roll surfaces must occur.

Figure 17:
FIG. 17 PRIOR ART
FIG. 17 is an enlarged cross sectional view of an unsymmetrical or skewed configuration of a corrugated conductor of the prior art.

In FIG. 16 with controlled input tension, a symmetrical corrugation shape emerges from between the rolls. The corrugations in the prior art took on an unsymmetrical or skewed configuration as shown in FIG. 17. This is normally referred to as a sawtooth shape, and is an undesirable characteristic of a corrugated laminate. A coaxial tube formed from the sawtooth corrugated laminate results in non-uniform impedance within prior art coaxial cable units.

The mechanism by which the sawtooth configuration develops is not fully understood; but it is thought that the problem is associated with nonuniform frictional forces developing from the relative motion between the roll surfaces and the laminate surfaces, and these frictional forces seem to be related to the tension existing in the laminate as it is fed into the corrugator. It has been found that control of the tension can reduce the sawtooth phenomenon.

The various radii, profile heights, profile pitches and angles at tangencies of radii illustrated in FIG. 16 are used so that the inner copper surface has the least take-up with maximum height of hoop strendth, greatest flexibility and minimum pitch because distortion of the corregation profile affects the electrical characteristics of the coaxial cable unit greatly.

Outer Conductor Forming and Soldering

Figure 18:
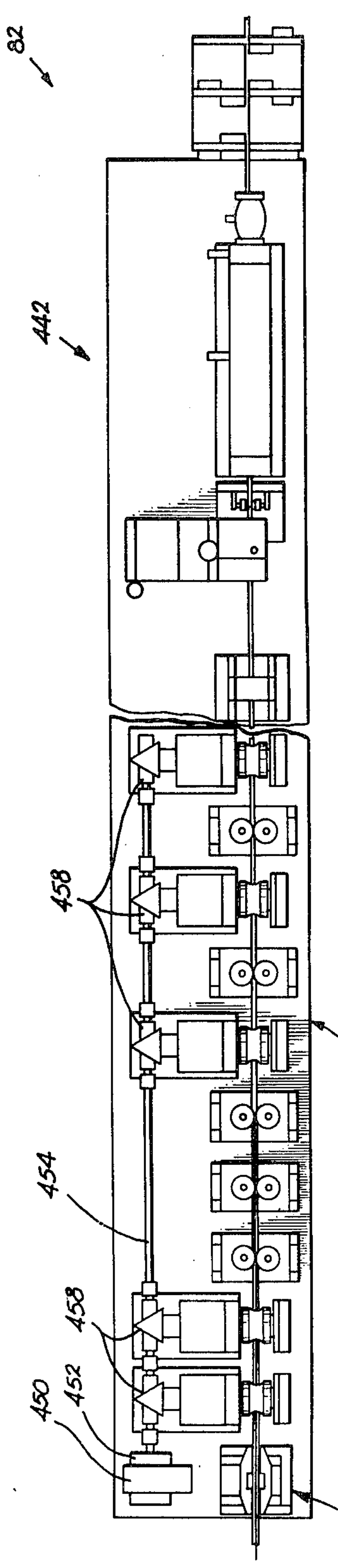
FIG. 18 is an enlarged plan view of a forming and soldering machine of the apparatus of FIG. 1.
Figure 19:
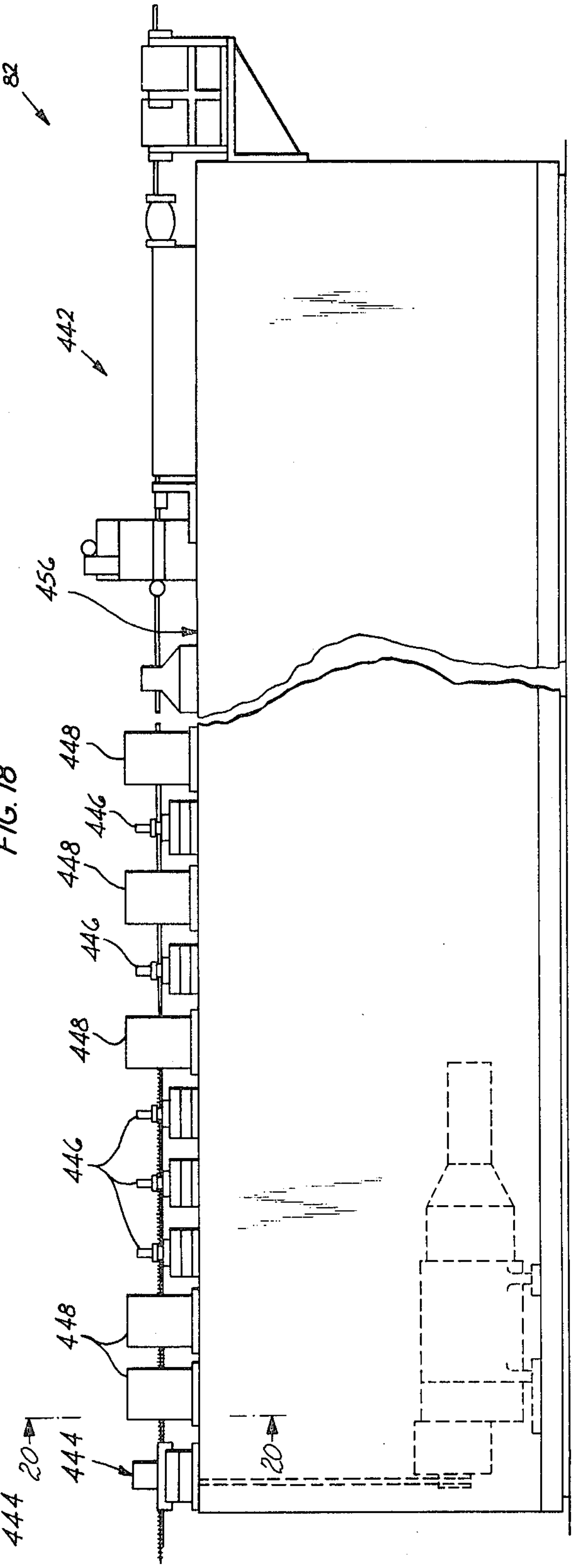
FIG. 19 is an enlarged side elevational view of the forming and soldering machine of FIG. 18.

Referring now to FIGS. 18 and 19, after the laminate 75 has emerged from between the corrugating rolls 390 and 391, it progresses to the forming and soldering machine 82. The forming and soldering machine 82 includes an input guide, designated generally by the numeral 444, a plurality of forming roll stands 446—446, having vertically oriented shafts, a plurality of forming roll stands 448—448, having horizontally oriented shafts, and a soldering station, designated generally by the numeral 442.

The roll stands 448—448 are power driven through a conventional drive train which includes a motor 450, a gear reducer 452 and a line shaft 454. There are five of the roll stands 448—448 interspaced with five of the vertical roll stands 446—446, all of which roll stands are mounted on a forming mill base, designated generally by the numeral 456. Each of the five roll strands 448—448 is provided with conventional right angle power take-off 458.

Figure 20:
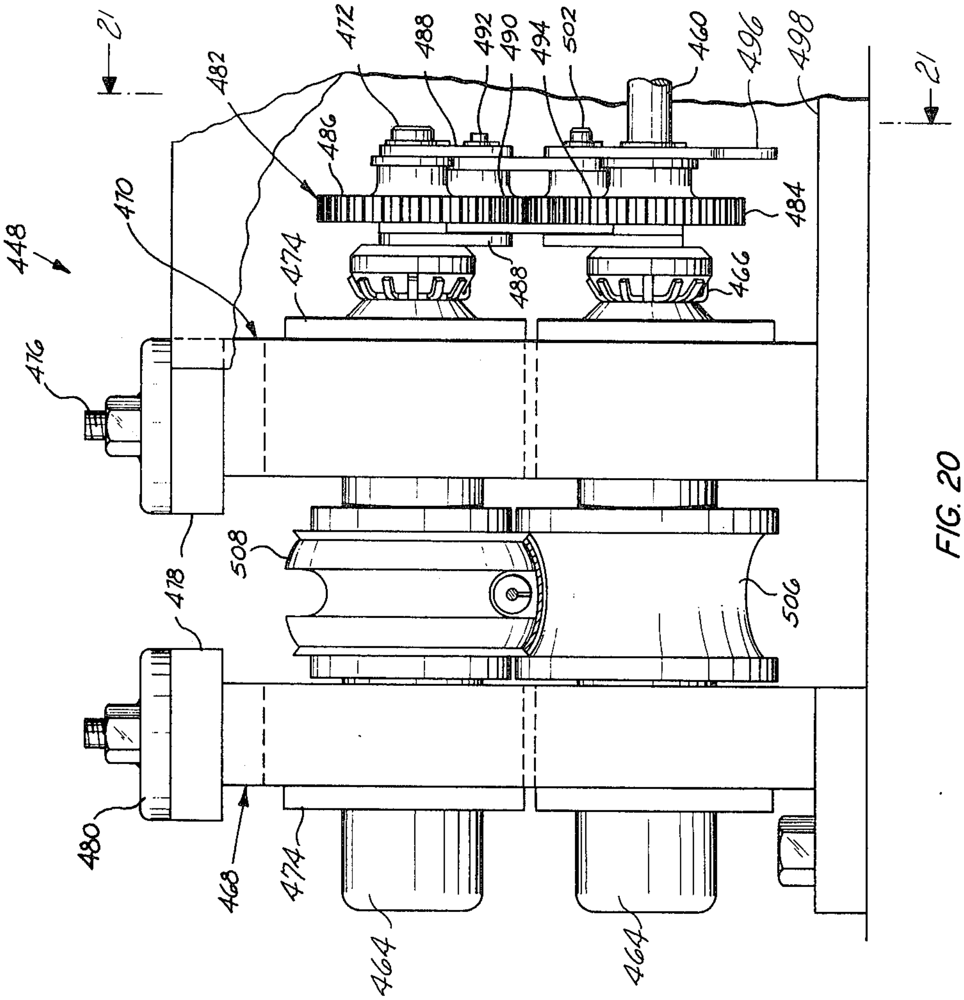
FIG. 20 is a front elevational view of a forming roll stand of the forming and soldering machine of FIG. 19 taken along lines 20—20 thereof.

A detailed view of one of the forming roll stands 448—448 can be seen by referring to FIG. 20. The power take-off 458 (FIG. 18) is coupled to a lower horizontal shaft 460 with a conventional flexible coupling (not shown). The shaft 460 is supported on conventional roller bearings 464—464. The shaft 460 is held in place within the roller bearings 464—464 with conventional bearing lock nuts 466—466. The bearings 464—464 are, in turn, supported within an outboard mounting frame, designated generally by the numeral 468, and an inboard mounting frame, designated generally by the numeral 470.

An upper horizontal shaft 472 is similarly supported within two of the conventional roller bearings 464—464. The bearings 464—464 which support the upper horizontal shaft 472 are mounted within bearing adjusting blocks 474—474. One of the adjusting blocks 474—474 is slidably mounted within the outboard mounting frame 468, and one of the adjusting blocks is similarly mounted within the inboard mounting frame 470. An adjusting screw 476 is pinned into each of the adjusting blocks 474—474. The screws 476—476 extend past the top of the associated mounting frames 468 and 470. Each of the mounting frames 468 and 470 is provided with a cap 478. A calibrated adjusting nut 480 is held in position within each of the caps 478—478 with a conventional retaining ring (not shown). Raising or lowering of the upper horizontal shaft 472 can be accomplished by turning the adjusting nuts 480—480.

The possibility of changing the position of the upper horizontal shaft 472 is desirable since it allows the forming roll stand 448 to accommodate various thicknesses of the laminate being formed and it also allows for the exertion of varying amounts of pressure on the laminate.

The upper shaft 472 is driven in synchronization with the lower shaft 460 through a planetary gear train, designated generally by the numeral 482. The shaft 460 has a conventional spur gear 484 mounted concentrically thereon. The upper shaft 472 is similarly provided with a conventional spur gear 486. The gears 484 and 486 are keyed to their respective shafts 460 and 472 with a conventional key (not shown). The pitch diameter of the gears 484 and 486 and the spacing between the centers of the shafts 460 and 472 are such that the gears do not become enmeshed.

Idler links 488—488 are rotatably mounted on the shaft 472 on both sides of the gear 486. A planetary gear 490 is mounted between the two idler links 488—488 which are suspended on the shaft 472. The planetary gear 490 has the same tooth configuration as the gear 486. The gear 490 is rotatably mounted on a shaft 492 which is held in place between the two idler links 488—488. The shaft 492 is spaced from the shaft 472 so that the gear 490 is properly enmeshed with the gear 486 (see also FIG. 21).

A planetary gear 494 is held in engagement with the gear 484 in a manner similar to that by which the gear 490 is held in engagement with the gear 486. The gear 494 is suspended between one of the idler links 488—488 and an extended idler link, designated generally by the numeral 496. The idler link 496 extends past the center line of the shaft 460 to the extent that the idler link can come into contact with a portion of a base 498 and a portion of a main frame, designated generally by the numeral 500.

The shaft 492 supporting the gear 490 and a shaft 502 supporting the gear 494 are held a fixed distance from each other by a connecting link 504—504. The gears 490 and 494 are held at such a distance that they are properly enmeshed. Since the gear 484 is enmeshed with the gear 494 and the gear 494 is enmeshed with the gear 490 which is ultimately enmeshed with the gear 486, it is obvious that all of the gears must have the same tooth profile.

Movement of the shaft 472 up or down will not interfere with the ability of the gear train 482 to drive the shaft 472 in synchronization with the shaft 460. A displacement of the center line of the shaft 472 upwardly will result in a slight revolution of the gear 490 about the axis of the gear 486 and a consequent slight revolution of the connecting link 504 about the axis of the gear 494.

The above-described arrangement reduces stretching of the laminate 75 being formed when differences exist between the surface speed of the laminate and the surface speed of a lower forming roll 506 and an upper forming roll 508 during acceleration or deceleration of the forming mill stand 448. As can be seen from FIG. 22, when surface speed of the laminate 75 is higher than the surface speed of the lower roll 506 mounted on the shaft 450, the upper roll 508 mounted on the shaft 472 is allowed to rotate at some rotational velocity different from the rotational velocity of the lower roll 506. When this condition occurs, the planetary gear 494 revolves clockwise about the axis of the gear 484, the planetary gear 490 revolves clockwise about the gear 486 until the extended idler link 496 comes into contact with the base 498.

Figure 22:
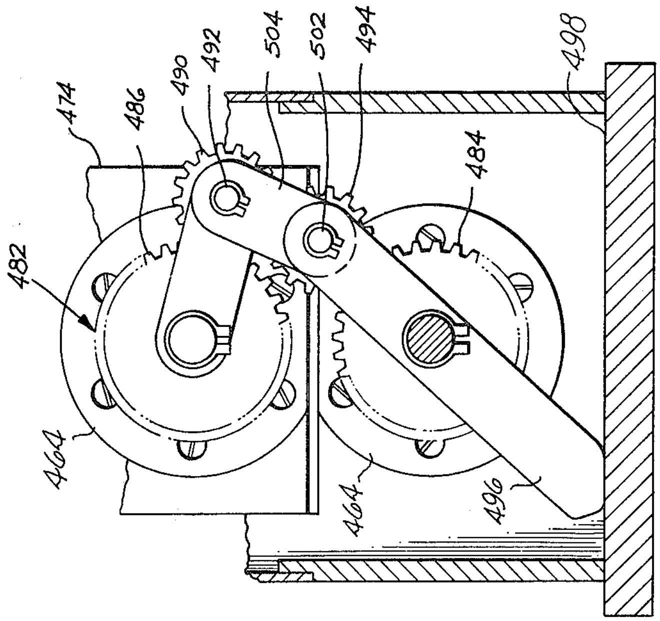
FIG. 22 is a fragmented view of the apparatus of FIG. 21 except in a different operational position.
Figure 21:
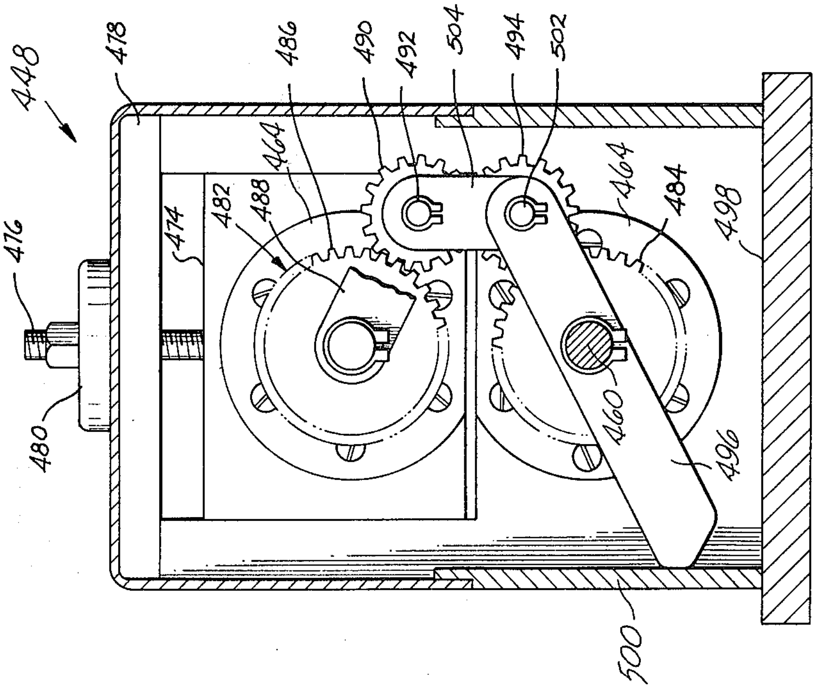
FIG. 21 is a sectional view of the forming roll stand of FIG. 20 taken along lines 21—21 thereof.

It can be seen that the shaft 472 can rotate, to a certain extent, independently of the rotation of the shaft 460 while the extended idler link 496 moves from a position in contact with a portion of the main frame 500 to the above-described position in contact with the base 498; in other words, the transition from the state shown in FIG. 21 to the state shown in FIG. 22. The ability of the upper roll 508 to "free-wheel" allows the surface speed of the upper roll to match the surface speed of the laminate 75. This ability to match surface speeds prevents sliding of the laminate 75 across the surface of the upper roll 508 and, thus, helps to reduce stretching of the laminate.

When the surface speed of the laminate 75 is lower than the surface speed of the rolls 506 and 508, the gear train 482 reacts in the opposite manner from the above-described pattern. The planetary gear 494 revolves about the axis of the gear 484 in a counterclockwise manner. The planetary gear 490 revolves about the axis of the gear 486 in a counterclockwise manner, and the extended idler link 496 moves from a position in which it is in contact with a portion of the base 498 to a position in which the link is in contact with a portion of the main frame 500.

Figure 23:
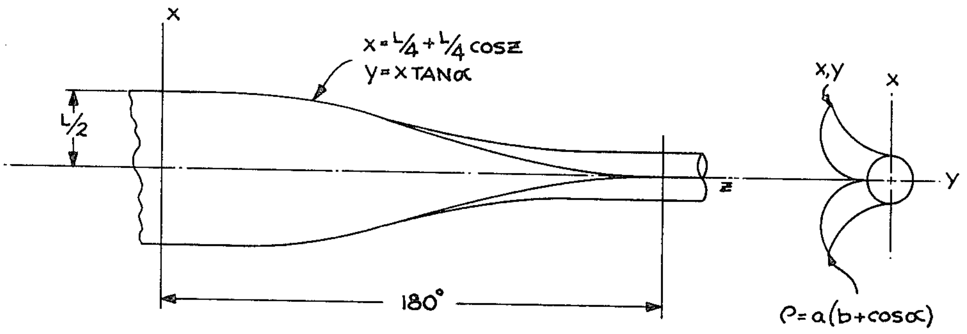
FIG. 23 is a combined illustration of the path of travel of a laminate as it is formed into an outer conductor of a coaxial cable unit embodying certain principles of the present invention.

When forming tubes with forming rolls such as the rolls 506 and 508, the edge of the strip could form a cosine curve when projected in the $x$, $y$ plane (see FIG. 23). A forming machine, consisting of pairs of rolls supported in roll stands spaced uniformly on a machine base, could be used to form tubes as has been the practice. The forming rolls must have a specific radius so that the edge of the formed strip will project on a cosine curve. The edge of a formed strip, as viewed from the end in an $x$, $y$ plane, forms a Limacon curve. In rectangular coordinates, this curve is of the 4th degree and difficult to determine, but in polar coordinates the general form is $\rho = a(b + \cos\alpha)$. If equally spaced roll forming stands are to be employed in the tube forming process, the radius of curvature and the $x$, $y$ points, which represent the edge of the strip in a section of forming, can be evaluated by mathematics for each roll in a particular stand. If the tube were being formed from a completely plastic material, one that stretches and compresses with no stress, this radius so obtained would be valid; but, all materials have "spring-back". Therefore, a strip material like the laminate must be overformed at each set of rolls to compensate for spring-back in order to end with a tube of the desired diameter having no extreme residue stresses after closing the seam by soldering or welding.

If tubes having residual stresses therein are used for the outer conductors 56—56 of the coaxial cable units 50—50 it is possible that the soldering at the overlapped seams 64—64 will creep and allow the diameter of the outer conductors to change. This would alter the characteristic impedance of the coaxial cable units 50—50, a highly undesirable result. Since transmission systems utilizing coaxial cable units are designed for well matched characteristic impedance of the elements of the system, changes in diameter of the outer conductor 56—56 would clearly be intolerable. Thus the elimination of residual stresses developing from improper compensation for spring-back is an important consideration when manufacturing the coaxial cable units 50—50.

In some simple tube forming situations, for example, forming a round tube from a well-known homogenous material having uniform physical properties, development in the art has empirically established some standards by which forming rollers can be built to incorporate the necessary degree of overforming for providing a tube substantially free of residual stresses. Such standards are only available after extensive experimentation and experience and are consequently unavailable for materials which have not been used in the past for the manufacture of tubing.

A first step in compensating for spring-back in complex materials is determination of the magnitude of the spring-back. Spring-back can be determined for a particular material by making a simple tensile pull test on a sample of the material. The test involves measuring the original length, applying a load which is beyond the proportional limit, measuring the stretched length, removing the load, and measuring the set length. Repeating the test on several samples of the same material, will give several set values from which an average can be obtained.

Figure 24:
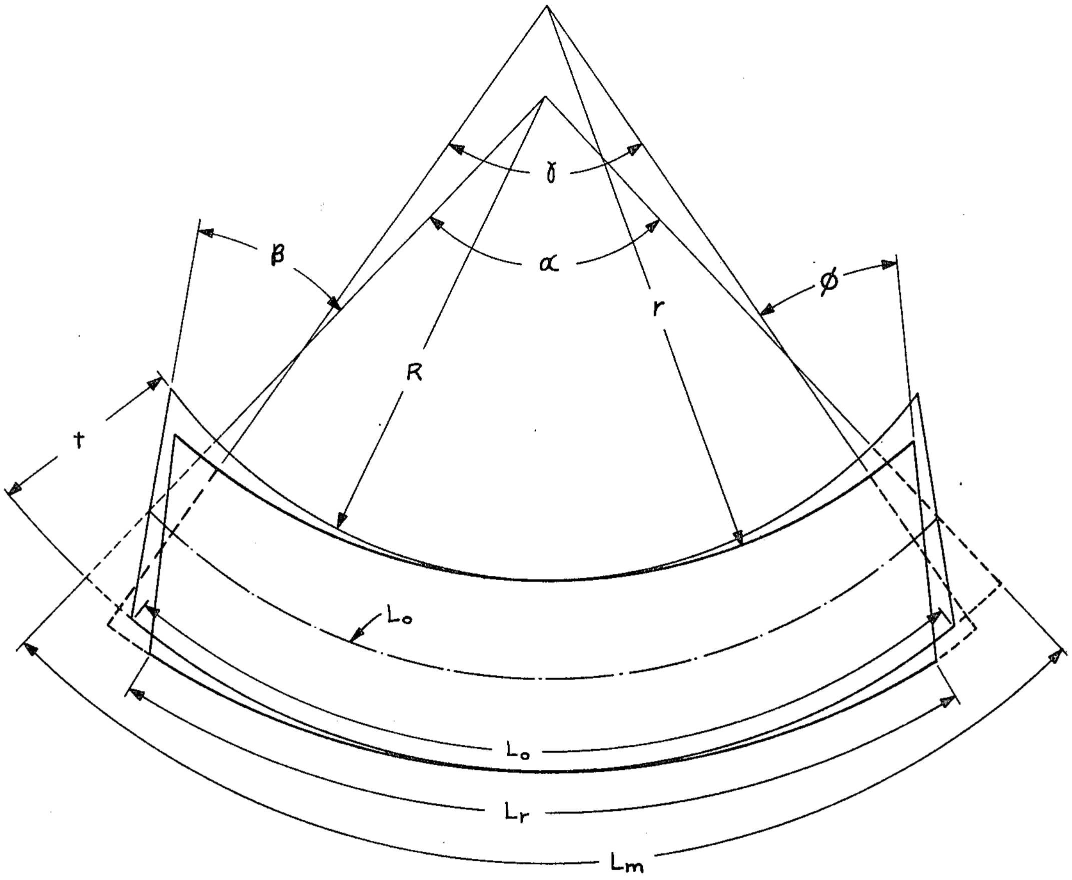
FIG. 24 is a graphic illustration of a mathematical method of finding a desired forming radius of a roll for forming flat strips into cylindrical tubes having certain desired characteristics.

Graphical results of a determination of spring-back are illustrated in FIG. 24 for the laminate 75. The tensile pull test can be performed on the laminate 75 in either the corrugated or uncorrugated state if the pulling is performed transversely of the axis of the tape, i.e., parallel to the corrugation.

Referring now to FIG. 24, the forming radius of a roll former for forming flat strips into tubes having certain desired characteristics may be determined by utilizing the following formulae:

$$R = \frac{360L_o}{2\pi\gamma},\ R\ \text{ı}\ \ \gamma \text{are not known}$$

$$r = \frac{360\ L_o}{2\pi\alpha},\ \alpha = \frac{360L_o}{2\pi r}$$

By theory, $\alpha - \gamma = 2\theta,\ \theta = \beta - \phi$ $$Lm = \frac{\pi\alpha(r + t/2)}{180}$$

$$\tan\beta = \frac{Lm - L_o}{t},$$

$$\tan\phi = \frac{Lm - Lr}{t}$$

-continued $$Lr = L_o + L_oS$$

$$\tan\phi = \frac{Lm - L_o - L_oS}{t}$$

$$2\theta + \gamma = \frac{360L_o}{2\pi r},\quad \gamma = \frac{360L_o}{2\pi r} - 2\theta$$

$$R = \frac{360L_o}{2\pi\left(\frac{360L_o}{2\pi r} - 2\theta\right)}$$

$$= \frac{90L_or}{90L_o - \pi r(\beta - \phi)}$$

$$R = \frac{90L_or}{90L_o - \pi r\left[\tan^{-1}\left(\frac{Lm - L_o}{t}\right) - \tan^{-1}\left(\frac{Lm - L_o - L_oS}{t}\right)\right]}$$

wherein R is radius of formed roll pass (unknown)
- $r$ is radius of formed tube after forming pass, determined
- $\alpha$ is the degrees of forming for a forming pass, determined
- $L_c$ is the original strip width
- Lr is the outer surface strip width in the relaxed stage (after spring-back)
- Lm is the theoretical outer surface strip width
- $t$ is strip thickness
- $\gamma$ is the degrees of forming for the formed strip (after spring-back)
- $\theta$ is the spring-back angle $= \beta - \phi$
- S is the amount of strain in inches per inch (determined from tensile test)

Calculations of Specific Example

The following conditions were set for a typical formed tube:

| | |
|---|---|
| 1. Nominal diameter of finished tube, | D = .390″<br>r = .195″ |
| 2. Outer diameter of finished tube | $D_o$ = .424″ |
| 3. Inner diameter of finished tube | $D_i$ = .356″ |
| 4. Thickness of material (corrugated), | t = .034″ |
| 5. Material overlap | W = .126″ |
| 6. Material width $L_o = \pi D + W$ | $L_o$ = 1.350″ |
| 7. Total degrees of forming $\alpha = \frac{360L_o}{2\pi r}$ | $\alpha_t$ = 396.657° |
| 8. Using 10 forming passes, degrees of forming per pass $\alpha_i$ | $\alpha_i$ = 39.6657° |
| 9. Strain "S" found from tensile test | S = .0015″/inch |

Find the nominal radius R, of the forming roll for 2nd pass.

Formed angle $\alpha_2 = 79.3314°$ $$\text{Formed radius } r_2 = \frac{180L_o}{2} = \frac{(180)(1.35)}{\pi(79.3314)} = .975''$$

Theoretical outer surface of formed strip = Lm $$Lm = \frac{\pi\alpha_2(r_2 + t/2)}{180} = \frac{\pi(79.33)(.975 + .017)}{180}$$

Lm = 1.3735 inches $$\text{Tan}\ \beta = \frac{Lm - L_o}{t} = \frac{1.3735 - 1.350}{.034} = .692 = 34°\ 41'$$

$$\text{Tan } \phi = \frac{Lm - Lr}{t},\ Lr = L_o + L_oS$$

$$= 1.350 + 1.350(.0015)$$

$$Lr = 1.352025$$

$$\text{Tan } \phi = \frac{1.3735 - 1.352025}{.034} = .6316 = 32°\ 17'$$

$$\theta = \beta - \phi = 34°\ 41' - 32°\ 17' = 2°\ 24' = 2.4°$$

$$\gamma = \alpha - 2\theta = 79.3314° - 4.8° = 74.5314°$$

$$R = \frac{180L_o}{\pi\gamma} = \frac{180(1.35)}{\pi(74.5314)}$$

R = 1.038"

$$R = \frac{90L_or_2}{90L_o - r_2 \tan^{-1} \frac{Lm - L_o}{t} - \tan^{-1} \frac{Lm - L_o - L_oS}{t}}$$

$$= \frac{90(1.35)(.975)}{90(1.35) - \pi(.975)(34.683 - 32.283)}$$

$$= \frac{118.4625}{121.5 - (3.06306)(2.4)}$$

$$= \frac{118.4625}{121.5 - 7.351404} = \frac{118.4625}{114.1486}$$

R = 1.038"

It is to be understood that the above-described arrangements are simply illustrative of the principles of the invention. Other arrangements may be devised by those skilled in the art which will embody the principles of the invention and fall within the spirit and scope thereof.

What is claimed is:

1. A method of forming a laminate from materials having different coefficients of thermal expansion which are bonded with a temperature sensitive adhesive, which comprises the steps of:

advancing the laminate along a path;

providing in the path a roller which is a segment of a sphere wherein the radius of curvature of the spherical segment of the roller is determined by the expression:

1. $r_o = r_2 - r_2[(\Delta l_c t_c) - (\Delta l_s t_c)] - T_s/2$ imparting a predetermined three-dimensional curvature having finite values greater than zero in each of the materials of the laminate while the adhesive is flowable and the materials are at some predetermined elevated temperature above ambient temperature by advancing the laminate over the roller such that the radius of curvature of the laminate material innermost of the roller and the laminate material outermost of the roller are determined by the expressions:

2. $r_1 = r_o + T_s/2$

3. $r_2 = r_o + T_s + T_a + T_c/2$, respectively, where $r_o$ is the radius of the spherical segment of the roller;

$r_1$ is the radius of the center line of the laminate material innermost of the roller;

$r_2$ is the radius of the center line of the laminate material outermost of the roller;

$\Delta l_s$ is the length of expansion of the laminate material innermost of the roller;

$\Delta l_c$ is the length of expansion of the laminate material outermost of the roller;

$t_c$ is the temperature of the laminate at the predetermined elevated temperature minus ambient temperature;

$T_s$ is the thickness of the laminate material innermost of the roller;

$T_c$ is the thickness of the laminate material outermost of the roller;

$T_a$ is the thickness of the adhesive; and cooling the materials to reach ambient temperature while removing the three-dimensional curvature so that a flat and substantially stress free laminate results;

the laminate being advanced along the path past the roller such that the three-dimensional curvature is imparted and removed continuously in successive portions of the materials forming the laminate.

2. The method of claim 1, wherein the step of removing the curvature includes continuously increasing the radius of three-dimensional curvature during cooling of the laminate from the elevated temperature to the ambient temperature in inverse proportionality with a temperature differential between ambient temperature and the temperature that exists at any given state of the cooling.

3. The method of claim 1, wherein the steps of removing the three-dimensional curvature includes advancing the laminate past a cylindrical roller spaced from facilities for imparting a three-dimensional curvature to the laminate.

4. The method of claim 3, wherein the temperature of the roller is below ambient to provide a heat sink for completing the cooling of the materials of the laminate.

5. The method of claim 3, wherein the cylindrical roller is spaced from the facilities for imparting a three-dimensional curvature to the laminate to insure that the cooling of the laminate to ambient is not completed until the laminate is advanced into engagement with the cylindrical roller.

6. An apparatus for forming a substantially stress-free laminate from materials having different coefficients of thermal expansion which are bonded with a temperature sensitive adhesive, which comprises:

means for advancing a laminate formed from materials having different coefficients of thermal expansion which are bonded with a temperature sensitive adhesive;

means including a roller which is a segment of a sphere for imparting a predetermined three-dimensional curvature having finite values greater than zero and substantially equal in each of three orthogonal directions in each of the materials of the laminate while the adhesive is flowable and the materials are at some predetermined elevated temperature above ambient temperature, wherein the radius of curvature of the spherical segment of the roller is determined by the expression:

1. $r_o = r_2 - r_2[(\Delta l_c t_c) - (\Delta l_s t_c)] - T_s/2$ and wherein the means for advancing the laminate causes the laminate to be passed over the roller such that the radius of curvature of the laminate material innermost of the roller and the laminate material outermost of the roller are determined by the expressions:

2. $r_1 = r_o + T_s/2$

3. $r_2 = r_o + T_s + T_a + T_c12$, respectively, where $r_o$ is the radius of the spherical segment of the roller;

$r_1$ is the radius of the center line of the laminate material innermost of the roller;

$r_2$ is the radius of the center line of the laminate material outermost of the roller;

$\Delta l_g$ is the length of expansion of the laminate material innermost of the roller;

$\Delta l_c$ is the length of expansion of the laminate material outermost of the roller;

$t_c$ is the temperature of the laminate at the predetermined elevated temperature minus ambient temperature;

$T_g$ is the thickness of the laminate material innermost of the roller;

$T_c$ is the thickness of the laminate material outermost of the roller;

$T_a$ is the thickness of the adhesive; and means for removing the three-dimensional curvature while cooling the materials to reach ambient temperature to produce a flat and substantially stress-free laminate;

the means advancing the laminate having the different coefficients of expansion along a path being such that the means for imparting curvature and cooling can be operated continuously on successive portions of the materials forming the laminate.

7. The apparatus of claim 6, wherein the means for removing the three-dimensional curvature includes:

means for continuously increasing the radius of three-dimensional curvature during cooling of the laminate from the elevated temperature to the ambient temperature in inverse proportionality with a temperature differential between ambient temperature and the temperature that exists at any given stage of the cooling.

8. The apparatus of claim 7, wherein the means for removing the three-dimensional curvature includes a cylindrical roller spaced from the means for imparting a three-dimensional curvature to the laminate.

9. The apparatus of claim 8, wherein the temperature of the roller is below ambient to provide a heat sink for completing the cooling of the materials of the laminate.

10. The apparatus of claim 8, wherein the cylindrical roller is spaced from the means for imparting a three-dimensional curvature to the laminate to insure that the cooling of the laminate to ambient is not completed until the laminate is advanced in engagement with the cylindrical roller.

* * * * *